United States Patent
Munoz et al.

(10) Patent No.: US 10,546,132 B2
(45) Date of Patent: Jan. 28, 2020

(54) STRING PROPERTY LABELS FOR STATIC ANALYSIS

(71) Applicant: HEWLETT PACKARD ENTERPRISE DEVELOPMENT LP, Houston, TX (US)

(72) Inventors: Alvaro Munoz, Las Rozas (ES); Yekaterina O'Neil, Sunnyvale, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 149 days.

(21) Appl. No.: 15/500,531

(22) PCT Filed: Sep. 30, 2014

(86) PCT No.: PCT/US2014/058224
§ 371 (c)(1),
(2) Date: Jan. 31, 2017

(87) PCT Pub. No.: WO2016/053282
PCT Pub. Date: Apr. 7, 2016

(65) Prior Publication Data
US 2017/0220806 A1    Aug. 3, 2017

(51) Int. Cl.
*H04L 29/06* (2006.01)
*G06F 21/57* (2013.01)
*G06F 11/36* (2006.01)

(52) U.S. Cl.
CPC ........ *G06F 21/577* (2013.01); *G06F 11/3604* (2013.01); *G06F 2221/033* (2013.01)

(58) Field of Classification Search
CPC . G06F 21/577; G06F 11/3604; G06F 2221/33
See application file for complete search history.

(56) References Cited

U.S. PATENT DOCUMENTS

| 5,862,382 A * | 1/1999 | Kataoka ............... G06F 8/75 717/125 |
| 8,302,080 B2 | 10/2012 | Wassermann et al. |
| 8,656,496 B2 | 2/2014 | Artzi et al. |
| 9,171,168 B2 * | 10/2015 | O'Neil ............... G06F 21/577 |
| 9,262,296 B1 * | 2/2016 | Soeder ............... G06F 11/36 |
| 9,792,443 B1 * | 10/2017 | Sheridan ............. G06F 21/577 |
| 2011/0088023 A1 | 4/2011 | Haviv et al. |
| 2012/0023486 A1 | 1/2012 | Haviv et al. |

(Continued)

OTHER PUBLICATIONS

Apple, Inc. "Source Editor Help: Performing Static Code Analysis", Sep. 18, 2013, https://developer.apple.com/library/ios/recipes/xcode_help-source_editor/Analyze/Analyze, 2 pgs.

(Continued)

*Primary Examiner* — Sarah Su

(57) ABSTRACT

In one implementation, a static analysis system can include an operator engine to identify a modification operation on a string based on a structural comparison of program code to a static analysis rule, a label engine to maintain a label with the string based on the static analysis rule, and a sink engine to identify that the label denotes a string property and provide an analysis message associated with the string property based on the label.

13 Claims, 4 Drawing Sheets

(56) References Cited

U.S. PATENT DOCUMENTS

| | | |
|---|---|---|
| 2012/0173500 A1* | 7/2012 | Chakrabarti ....... G01C 21/3611 707/706 |
| 2012/0216177 A1 | 8/2012 | Fink et al. |
| 2012/0317143 A1 | 12/2012 | Pistoia et al. |
| 2014/0040855 A1 | 2/2014 | Wang et al. |
| 2014/0075561 A1 | 3/2014 | Guarnieri et al. |
| 2014/0096257 A1* | 4/2014 | Chou .................... G06F 21/577 726/25 |
| 2014/0115564 A1 | 4/2014 | Guarnieri et al. |
| 2014/0173571 A1 | 6/2014 | Gluck et al. |
| 2014/0280062 A1* | 9/2014 | Augustin .......... G06F 17/30991 707/722 |
| 2014/0331207 A1* | 11/2014 | Sridharan ............. G06F 9/4843 717/124 |
| 2015/0309813 A1* | 10/2015 | Patel ........................ G06F 8/75 703/22 |
| 2015/0379272 A1* | 12/2015 | Liu ....................... G06F 21/577 726/25 |
| 2018/0239904 A1* | 8/2018 | Kiner .................... G06F 21/562 |
| 2018/0336356 A1* | 11/2018 | Papaxenopoulos ... G06F 21/563 |

OTHER PUBLICATIONS

Tomb, et al., "Variably interprocedural Program Analysis for Runtime Error Detection", Association for Computing Machinery, ISSTA'07, Jul. 9-12, 2007. London, England, 11 pgs.

Wasserman, et al. "Sound and Precise Analysis of Web Applications for Injection Vulnerabilities", Jun. 10-13, 2017, 2 pages.

* cited by examiner

STRING PROPERTY LABELS FOR STATIC ANALYSIS

BACKGROUND

Static analysis is a technique to study a program by analyzing program code (e.g., source code and/or object code) without executing the program. Static analysis is commonly performed by an automated static analysis tool to analyze the program code using a mathematical technique and/or program simulation technique. For example, a static analysis tool can simulate code execution paths based on program simulations and/or mathematical functions. A static analysis tool can commonly perform functions to identify coding errors and/or mathematically prove properties about the program code. For example, static analysis can be used to verify properties of a program and locate a potential vulnerability to a malicious attack.

DETAILED DESCRIPTION

Figure 1:
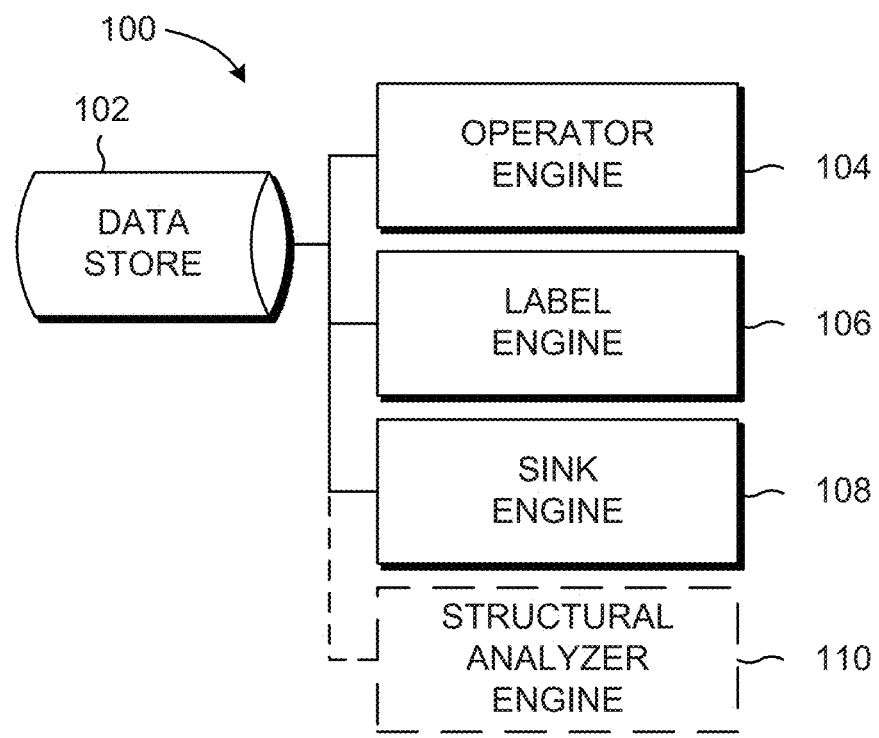
FIGS. 1 and 2 are block diagrams depicting example static analysis systems.

In the following description and figures, some example implementations of static analysis systems and/or methods are described. A benefit of static analysis is being able to find vulnerabilities in program code (i.e., set of executable instructions) without executing the program code. However, because code execution paths are simulated, real execution paths may differ from the simulated paths. This can lead to results of the static analysis tool to include false positives or false negatives. Some static analysis vulnerability categories suffer from a relatively high false results rate that impacts the accuracy of the static analysis. One technique of static analysis is taint analysis. Taint analysis is a technique that emulates a program execution where data entering through various user-controlled sources is propagated through the application until the data reaches a consumption point or sink as discussed herein. For example, data can be tainted if the data is controlled by a user.

A static analyzer can perform taint analysis based on a set of static analysis rules. A static analysis rule is a data structure that describes a condition and a result based on the condition to produce a model of the dataflow (e.g., propagation flow of data) through program code. For example, a static analysis rule can cause a static analysis tool to parse a line of code, identify fields and structure of the line of code, and perform a function (such as add a taint label) based on structure and/or entries of the fields parsed from the line of code. Static analysis rules can be organized into security rules and infrastructure rules. Security rules are static analysis rules related to security based on operation of the program code and known vulnerabilities. An infrastructure rule is a static analysis rule associated with how the program code interacts with other program code. Static analysis rules can utilize taint labels to make vulnerability determinations at a sink. Example taint labels include security taint labels (e.g., a label particular to security vulnerability), generic taint labels (e.g., a label indicating the source of data), neutral taint labels (e.g., a label associated with how data propagates), and the like.

An example data structure of a rule can include a rule identification value; a function identifier having a namespace, a class name, a function name, and the like; an input argument, and an output argument. Using that example data structure, the example rule above can, for example, identify that the code line example of "String a=text.getData( )" describes that if "text" is tainted, then "a" will also be tainted. For another example, a variable "url" can represent a uniform resource locator ("URL") such as "[anexamplesite.com]" and the code segment of "Redirect (url+req.getParameter("url"));" and "Redirect(req.getParameter("url"));" both utilize untrusted data, but the first code statement redirects the user to a different page on the same site rather than the second code statement which allows the retrieved parameter to include a different site, such as a malicious site. The priority of the vulnerability to untrusted data for these two statements of code should be different even though both utilize untrusted data.

Various examples described below relate to incorporating a string property label associated with operations that manipulate a string to static analysis and decrease the number of false results provided by a static analyzer. By attaching labels to data as the data is modified, a sink can identify whether to report a vulnerability based on the labels attached to the data. In the previous example URL parameter retrieval code statements, the URL retrieved from the request can be flagged as untrusted and vulnerable, but the code statement having a static concatenation to the beginning of the URL can be flagged with a lower-rated vulnerability because the redirect is restricted to particular locations which can decrease the vulnerability of the program to cross-site scripting attacks. Based on the severity of the vulnerability and the structure of code operations, the vulnerability issue of the untrusted data can be given an appropriate priority level in a vulnerability report or even provide the report without the vulnerability issue depending on the characterization of the code based on the structure and modification of the untrusted data as described by the string property label(s).

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, associate, attach, affix, and/or modify."

Figure 2:
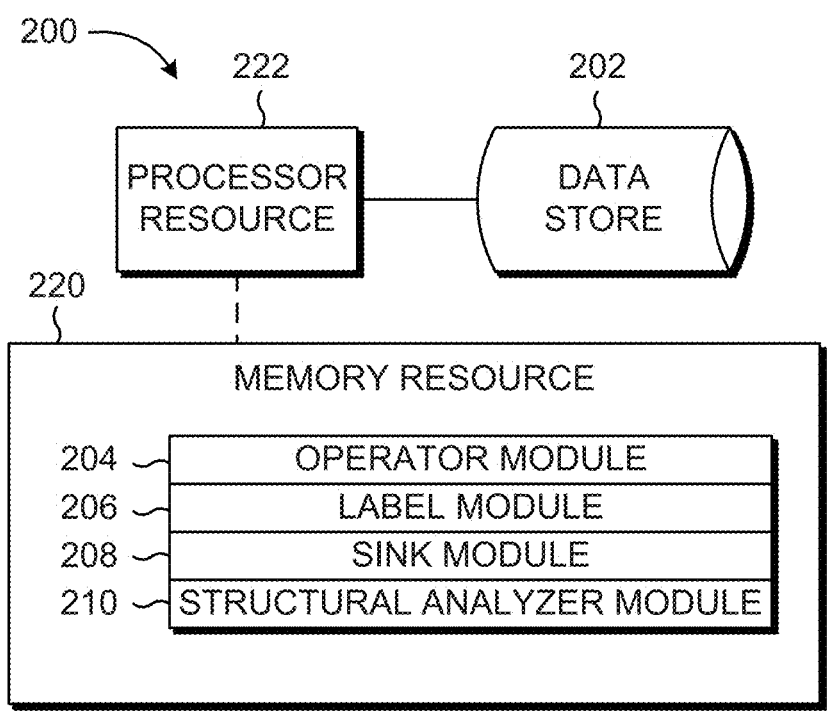

FIGS. 1 and 2 are block diagrams depicting example static analysis systems 100 and 200. Referring to FIG. 1, the example static analysis system 100 of FIG. 1 generally includes a data store 102, an operator engine 104, a label engine 106, and a sink engine 108. In general, the label engine 106 can label data based on a modification operation to the data identified by the operator engine 104 and the label can be used by the sink engine 108 to identify an analysis message associated with the label. The example static analysis system 100 can include a structural analyzer engine 110 to facilitate comparison of the program code to a static analysis rule.

The operator engine 104 represents any circuitry or combination of circuitry and executable instructions to identify a modification operation on a string during an analysis session based on a structural comparison of program code to a static analysis rule. A modification operation can be an operation that manipulates a string. Example string operations include concatenations and string replacements, such as a sub-string replacement. The modification operation can be identified by an operator, such as a plus sign, or a known function, such as a known library function for concatenation.

The modification operation can operate on untrusted data based on the source of the string. The string can represent a variable capable of receiving untrusted data from a user. If the string is vulnerable to malicious code, a modification operation on the string can preserve or decrease the vulnerability based on the category of the modification operation. For example, a redirect using untrusted data can be restricted from full exploitation by concatenating a static string to the beginning (e.g., the left-hand side) of the untrusted data.

A static analysis rule can include a condition for applying the result of the rule. The condition can be based on a comparison of the structure of program code being analyzed with the static analysis rule. For example, the structure of program code can include the characters that identify a particular operation, such as a plus sign used to denote the concatenation operator. For another example, the structure of the program code can denote fields, such as arguments to the operation, by finding particular characters, such as commas, to delineate separation of values and/or variables. The structural comparison can be performed by the structural analyzer engine 110 discussed in more detail below.

The location of the string in the result data of the modification operation (i.e., the data resulting from the modification operation) can be identified based on the structural comparison. For example, the operator engine 104 can identify a concatenation operation on a string based on a structural comparison of the program code to known concatenation operation forms. For another example, the operator engine 104 can identify a location of the string in the result data of a concatenation operation based on the structure of program code having the string on the left side or right side of the concatenation operator.

The label engine 106 represents any circuitry or combination of circuitry and executable instructions to maintain a label with the string based on a static analysis rule. The label can be any number, character, string, category, or other value capable of representing a property of a string. Example labels regarding the context described herein includes a concatenation label, a replacement label, a prefix label, and a suffix label. Other examples of labels include security-specific and vulnerability-specific labels and generic labels, such as labels about the origin of the data. The label identifies how the string has been modified by the modification operation. For example, the label can describe a category of the modification operation (e.g., a concatenation operation or replacement operation) and a location of the modification operation (e.g., is the string concatenated to the left side or right side of a variable) based on the untrusted data.

Any appropriate data of the program code can be associated with a label. Associating a label with a set of data is referred to herein as "flagging" or appropriate variation thereof. For example, result data of a concatenation operation can be flagged with a concatenation label. For another example, result data can be flagged based on a location of the untrusted string in the result data, such as with one of a first label to denote an untrusted prefix when the location of the string is on a left-hand side of the result data and a second label to denote an untrusted suffix when the location of the string is on a right-hand side of the result data.

The sink engine 108 represents any circuitry or combination of circuitry and executable instructions to identify a string property based on the label and provide an analysis message associated with the string property based on the label. For example, the sink engine 108 can identify a concatenated string from the label and cause a static analyzer to provide a message (e.g., report a finding) of a tainted concatenated string. For another example, the sink engine 108 can identify that the label denotes the string property based on a rule and/or a map that associates the label with the string property. The sink engine 108 can provide an appropriate message based on the string property identified based on the label. For example, a message stating the vulnerability issue associated with the string property can be caused to present to a user of a static analysis tool. The sink engine 108 can determine the set of data is not vulnerable based on the label when the static analyzer would otherwise determine so without the string property label. For example, the sink engine 108 can identify the string was concatenated with a prefix string based on the prefix label and then provide an analysis message that the code utilizing the string is lacking a particular vulnerability due to the prefixed string property. For another example, an API can be vulnerable or not depending on the implementation of the API (e.g., how the API utilizes the data, such as a string). A string property can be associated with a security issue, such as a vulnerability, of a code statement and the sink engine 108 can report an issue associated with a set of data when the set of data is flagged with a label associated with the string property. The sink engine 108 can provide a message, such as a report, based on the sink sensitivity to the data modifications modeled by labels affixed to the data, such as the string property label. The sensitivity of the sink refers to the ability of the sink to evaluate program code based on any string properties of the data arriving at the sink, the source of the data of the program code, whether the data is validated, and the like. In this manner, the presence of labels that are neutral to security can provide insight on whether to report an issue to which the sink is sensitive or not report an issue when the sink is not sensitive to the issue.

The sink engine 108 identify a priority level of a vulnerability based on the label associated with the string (e.g., affixed to the string) and report the priority level of a set of data. A priority level can determine the level of urgency and/or level of importance of an issue in the report. In this manner, the report can organize issues based on the level of priority. The string property label can be used to determine a level of priority. For example, a concatenation operation on an untrusted string used for a URL redirect can be given a high level of priority relative to a concatenation operation that has concatenated a sandbox URL to the untrusted string to make code less vulnerable to exploitation, such as a redirect from cross-site scripting. The priority level can be determined based on a plurality of labels associated with a set of data. For example, the plurality of labels can include a neutral label (e.g., a string property label) as well as a generic label or a security label.

The structural analyzer engine 110 represents any circuitry or combination of circuitry and executable instructions to translate the program code into on an intermediate model. An intermediate model can be any appropriate form of representing common constructs (e.g., program language constructs such as branches, functions, declaration, and the like) based on arrangements of data (e.g., the structure of the program code). For example, the intermediate model can be a representation of program code based on common syntax constructs of a programming language. For another example, an intermediate model can comprise meta-data of source code and a data structure to represent language constructs, such as a tree that branches conditions and result bodies of the code for each operation and/or functional characters of the program language. The structural analyzer engine 110 can translate program code to identify structure of the program code. For example, the program code can be translated by a parser as part of translation to an intermediate model. The structural analyzer engine 110 can identify a modification operation construct in the program code and a field associated with the string of the modification operation based on the intermediate model. The intermediate model can utilize and/or include a mapping of known operations and fields to recognize the structure of the program code. For example, the program language being used may contain a set of designated characters that represent particular operations, such as "if," "while," "return," and the like represented by a map. In this manner, the operator engine 104 can receive translated information from the structural analyzer engine 110 to identify operations and variables that can be labeled, such as a concatenation operator or a sub-string replacement function. With the operations identified, the variables of the program code can be compared to a mapping of known operations that should be labeled with neutral taint labels based on a static analysis rule. For example, the program code structure identified by the structural analyzer engine 110 can be compared to the conditions of a security rule, such as a security rule that applies a concatenation label on a concatenation operator, and flagged with the label when the condition is satisfied.

The data store 102 can contain information utilized by the engines 104, 106, 108, and 110. For example, the data store 102 can store program code, a label, a string, a map, an intermediate model, a static analysis rule, and the like.

FIG. 2 depicts the example system 200 can comprise a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as an operator module 204, a label module 206, a sink module 208, and a structural analyzer module 210. The operator module 204, the label module 206, the sink module 208, and the structural analyzer module 210 represent program instructions that when executed function as the operator engine 104, the label engine 106, the sink engine 108, and the structural analyzer engine 110 of FIG. 1, respectively. The processor resource 222 can carry out a set of instructions to execute the modules 204, 206, 208, 210, and/or any other appropriate operations among and/or associated with the modules of the system 200. For example, the processor resource 222 can carry out a set of instructions to perform a comparison of a structure of program code to a security rule via an intermediate model, identify a concatenation operation on a string of the program code based on the comparison, identify a location of the string in a result of the concatenation operation based on the structure of the program code, flag the result with a first label to denote one of an untrusted prefix or an untrusted suffix based on whether the location of the string is on the left-hand side of the result data or the right-hand side of the result data, and report an issue associated with the result based on the label flagged with the result. For another example, the processor resource 222 can carry out a set of instructions to cause a vulnerability report to include the vulnerability issue of the result data when the result data is flagged with a first label or cause a vulnerability report to lack the vulnerability issue of the result data when the result data is flagged with a second label and determine the result data is not a vulnerability when the result data includes the second label. In that example, the determination of the state of the vulnerability can be based on the presence or absence of a neutral taint label indicating a string property.

Figure 4:
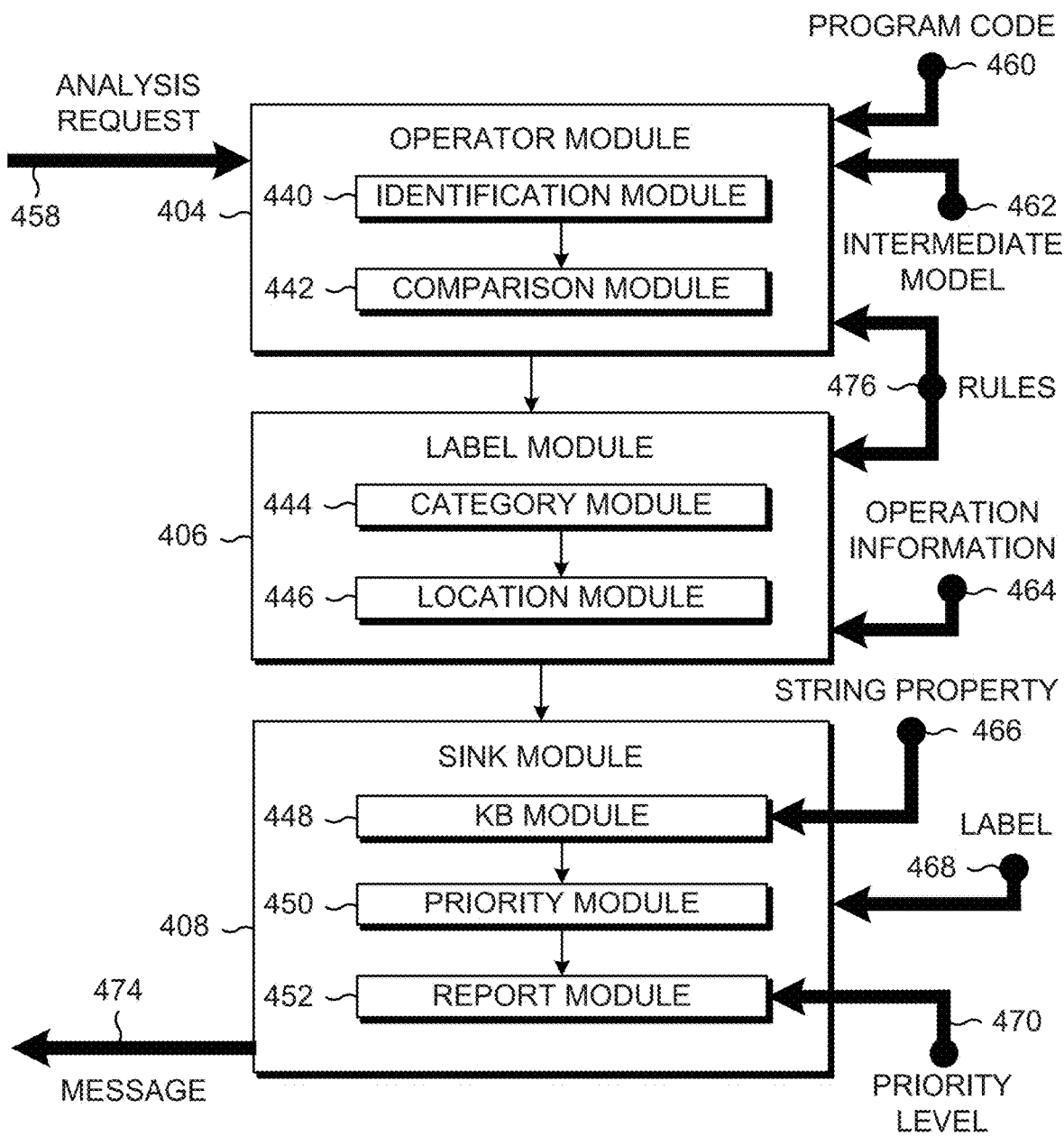
FIG. 4 depicts example modules consistent with example static analysis systems.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 4 depicts yet another example of how functionality can be organized into modules.

The processor resource 222 can be any appropriate circuitry capable of processing (e.g. compute) instructions, such as one or multiple processing elements capable of retrieving instructions from the memory resource 220 and executing those instructions. For example, the processor resource 222 can be a central processing unit ("CPU") that enables static analysis of program code by fetching, decoding, and executing modules 204, 206, 208, and 210. Example processor resources 222 include at least one CPU, a semiconductor-based microprocessor, an application specific integrated circuit ("ASIC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e. storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums.

The data of the data store 202 can include representations of data and/or information mentioned herein.

In the discussion herein, the engines 104, 106, 108, and 110 of FIG. 1 and the modules 204, 206, 208, and 210 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

Figure 5:
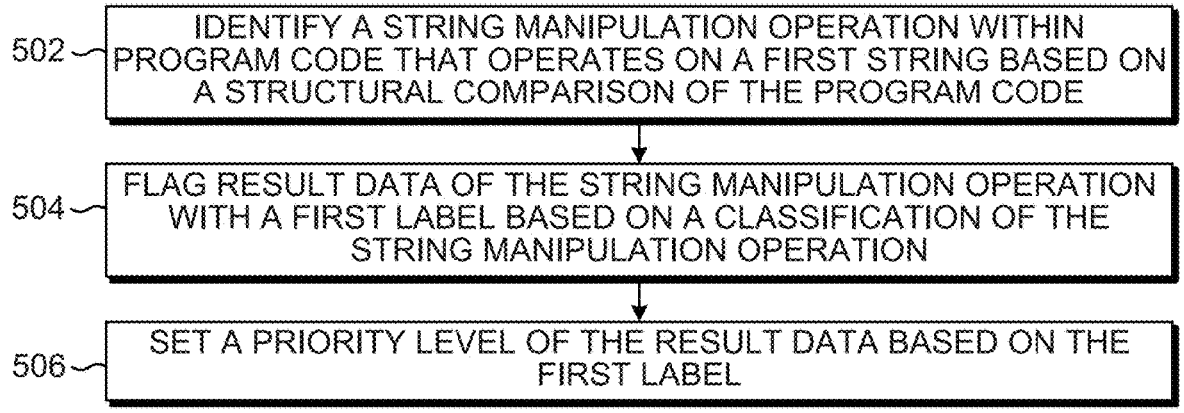
FIGS. 5 and 6 are flow diagrams depicting example methods for static analysis of program code.
Figure 6:
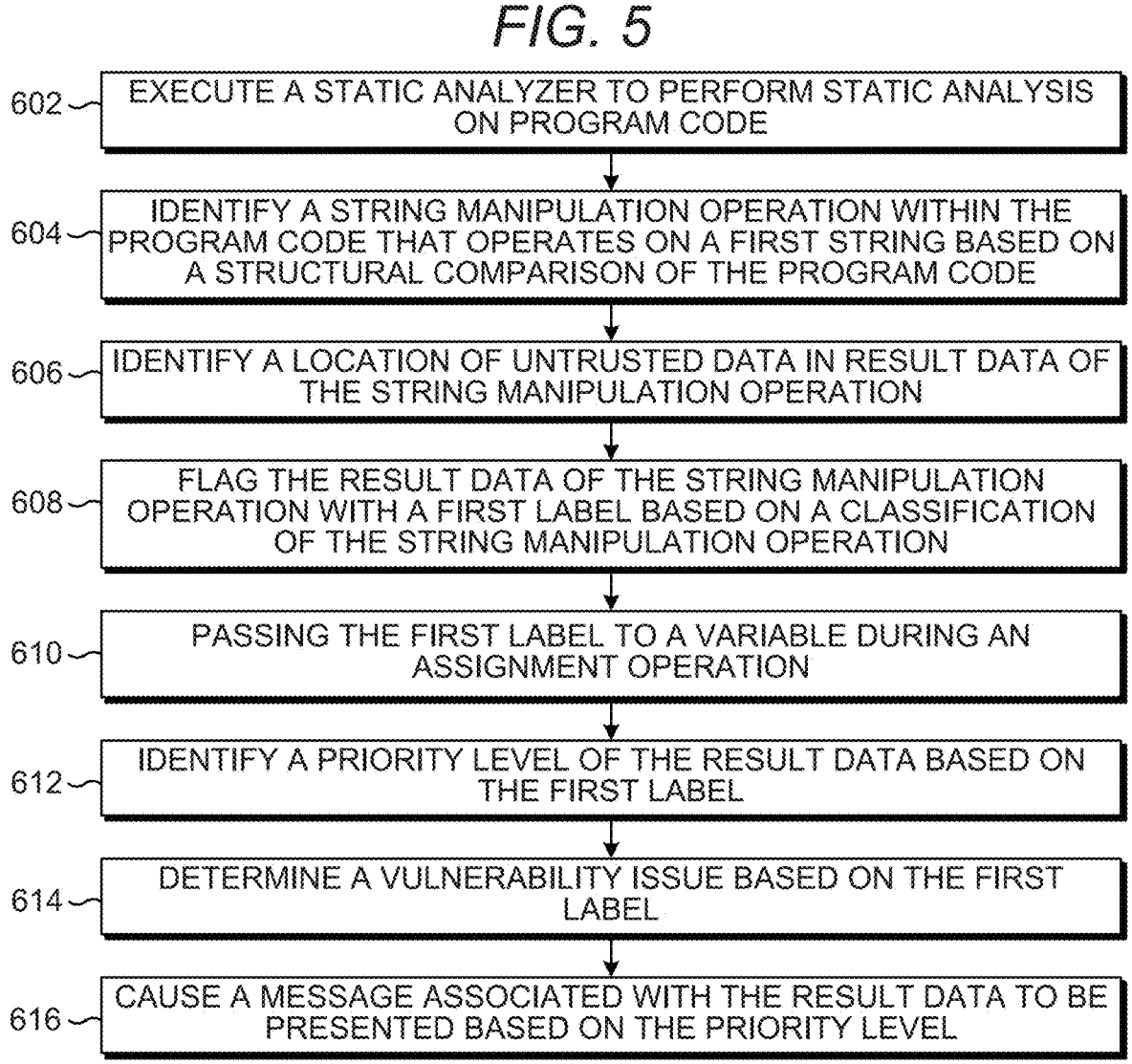

In some examples, the system 200 can include the executable instructions can be part of an installation package that when installed can be executed by the processor resource 222 to perform operations of the system 200, such as methods described with regards to FIGS. 4-6. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
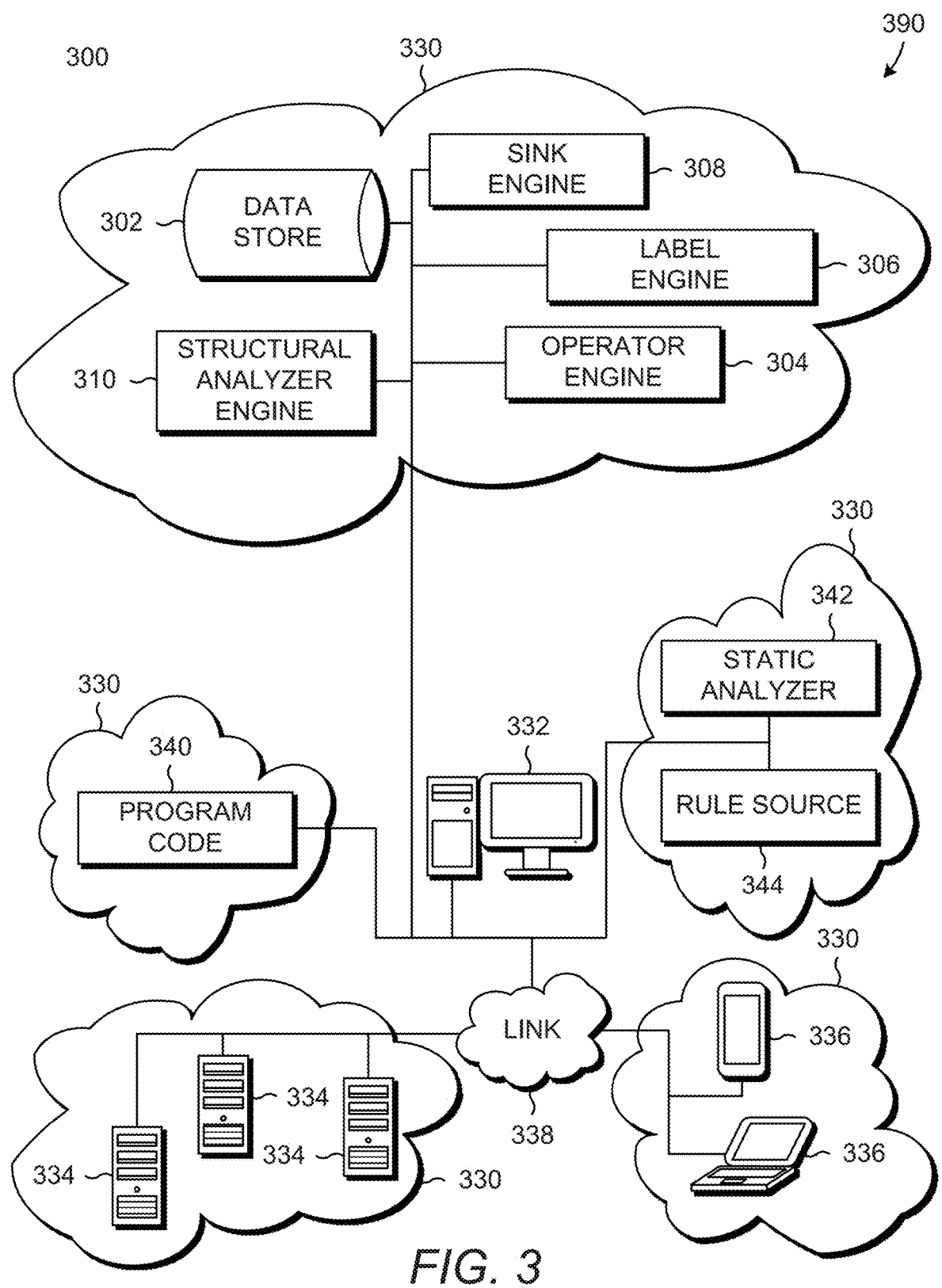
FIG. 3 depicts an example environment in which various static analysis systems can be implemented.

FIG. 3 depicts example environments in which various example static analysis systems can be implemented. The example environment 390 is shown to include an example system 300 for static analysis of program code. The system 300 (described herein with respect to FIGS. 1 and 2) can represent generally any circuitry or combination of circuitry and executable instructions to statically analyze program code. The system 300 can include a data store 302, an operator engine 304, a label engine 306, a sink engine 308, and a structural analyzer engine 310 that are the same as the operator engine 104, the label engine 106, the sink engine 108, and the structural analyzer engine 110 of FIG. 1, respectively, and the associated descriptions are not repeated for brevity. As shown in FIG. 3, the engines 304, 306, 308, and 310 can be integrated into a compute device, such as a service device 334. The engines 304, 306, 308, and 310 can be integrated via circuitry or as installed instructions into a memory resource of the compute.

The example environment 390 can include compute devices, such as developer devices 332, service devices 334, and user devices 336. A first set of instructions, such as program code 340, can be developed and/or modified on a developer device 332. For example, an application can be developed and modified on a developer device 332 and stored onto a web server, such as a service device 334. The service devices 334 represent generally any compute devices to respond to a network request received from a user device 336, whether virtual or real. For example, the service device 334 can operate a combination of circuitry and executable instructions to provide a network packet in response to a request for a page or functionality of an application. For another example, the service device 334 can host a static analyzer 342 that utilize a rule source 344 of rules to analyze program code 340. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices can be located on separate networks 330 or part of the same network 330. The example environment 390 can include any appropriate number of networks 330 and any number of the networks 330 can include a cloud compute environment. A cloud compute environment may include a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, and 110 of FIG. 1 and/or the modules 204, 206, 208, and 210 of FIG. 2 can be distributed across devices 332, 334, 336, or a combination thereof. The engine and/or modules can complete or assist completion of operations performed in describing another engine and/or module. For example, the label engine 306 of FIG. 3 can request, complete, or perform the methods or operations described with the label engine 106 of FIG. 1 as well as the operator engine 104, the sink engine 108, and the structural analyzer engine 110 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 can perform example methods described in connection with FIGS. 4-6.

FIG. 4 depicts example modules used to implement example static analysis systems. Referring to FIG. 4, the example modules of FIG. 4 generally include an operator module 404, a label module 406, and a sink module 408. The operator module 404, the label module 406, and the sink module 408 can be the same as the operator module 204, the label module 206, and the sink module 208 of the FIG. 2. The example modules of FIG. 4 can be implemented on an example compute device, such as a service device 334.

A processor resource executing the operator module 404 can receive an analysis request 458 and cause program code 460 to be analyzed based on the intermediate model 462, such as a tree data structure representing an intermediate model provided by a processor resource executing a structural analyzer module (not shown) that when executed performs the function of the structural analyzer engine 110 of FIG. 1. The operator module 404 can include program instructions, such as an identification module 440 and a comparison module 442, to facilitate identification of a modification operation in the program code 460. The identification module 440 represents program instructions that when executed by a processor resource causes the process resource to receive the operations, fields, and arguments of the program code based on the intermediate model 462. The intermediate model 462 represents a model of a code segment of the program code 460 translated to an intermediate form of program language constructs (e.g., operations, fields, arguments, and the like). The comparison module 442 represents program instructions that when executed by a processor resource cause the processor resource to compare the identified operations to a static analysis rule condition of the rules 476.

A processor resource can execute the label module 406 to cause the processor resource to receive the operation information 464 identified by a processor resource executing the operator module 404 and flag the program code 460 with an appropriate label 468 based on the operation information 464. The label module 406 can include program instructions, such as a category module 444 and a location module 446, to facilitate determination of an appropriate label based on the rules 476 and the operation information 464. The category module 444 represents program instructions that when executed by a processor resource cause the processor resource to identify a category (e.g., type) of a modification operation (such as a concatenation or string replacement), on a string containing untrusted data based on the identified operations of the operation information 464 via the intermediate model 462 and known operations that should be associated with a label based on the modification effect of the operation. Known operations can be provided via the rules 476. The location module 446 represents program instructions that when executed by a processor resource cause the processor resource to identify the location of the untrusted data based on the program structure identified via the intermediate model 462 and provided in the operation information 464. For example, the location can be the location of the untrusted data in the result string and/or the location of the untrusted data in the input arguments to the modification operation. The label module 406 can flag the program code (e.g., maintain a label with the program code) based on the category of the modification operation and the location of untrusted data of a string.

A processor resource executing the sink module 408 can receive the data at a sink and determine an issue (e.g., a vulnerability) based on rules at the sink and the label 468 associated with the data. The sink engine 408 can include program instructions to facilitate the analysis of the data at the sink, such as a knowledge base ("KB") module 448, a priority module 450, and a report module 452. The KB module 448 represents program instructions that when executed cause the processor resource to identify a string property 466 based on the label 468. For example, the processor resource can retrieve a map of the label to a string property or a combination of labels to a string property 466. For another example, the processor resource executing the KB module 448 can utilize the analysis rules as a knowledge base to identify the string property of the data arriving at the sink with the label 468. The priority module 450 represents program instructions that when executed by a processor resource cause the processor resource to determine a priority level 470 of the string property 466. The priority level 470 of the string property 466 can be based on the label 468 and/or a plurality of labels associated with the data, as applied to analysis rules at the sink. For example, a first neutral label associated with the data can decrease the priority level 470 compared to a second neutral label. The report module 452 represents program instructions that when executed by a processor resource cause the processor resource to determine whether an issue associated with the string property 466 is to be reported and how the issue is to be reported (if the issue is to be reported) based on the priority level 470. For example, a processor resource executing the report module 452 can generate a report which can include an issue having a prefix concatenation label with a high priority level with a distinguishing color, leave out an issue associated with a suffix concatenation label, and place an issue with a sub-string replacement label at the end of the report based on the low priority level of the sub-string replacement property. A processor executing the sink module 408 can provide a message 474 of the analysis performed by the sink module 408. Example messages 474 can include a network communication having a payload of the analysis, a full analysis report of a program code in the form of an electronic file, an email containing the discovered issues, or a communication to produce a web page that displays a dashboard of vulnerability issues related to the program code. The message form can be based on the static analyzer used to perform the static analysis.

FIGS. 5 and 6 are flow diagrams depicting example methods for static analysis of program code. Referring to FIG. 5, example methods for static analysis of program code can generally comprise identifying a string manipulation operation within program code, flagging result data of the string manipulation operation with a first label, and setting a priority level of the result data.

At block 502, a string manipulation operation is identified within program code that operates on a first string based on a structural comparison of the program code. A string manipulation operation is a modification operation performed on a string to manipulate the string in some fashion. The first string can be untrusted based on the source of the data of the first string, such as requests for data from a user or other manipulated variable. At block 504, the result data of the string manipulation operation can be flagged with a first label based on a classification of the string manipulation operation. The classification can describe how the result data is built based on the first string and the first label can describe the string property of the string based on the string manipulation operation. The priority level of the result data is set at block 506 based on the first label. The priority level of the result data can be determined at a sink during an analysis session performed by a static analyzer that is compatible with taint labels for taint analysis.

FIG. 6 includes blocks similar to blocks of FIG. 5 and provides additional blocks and details. In particular, FIG. 6 depicts additional blocks and details generally regarding executing a static analyzer, identifying a location of untrusted data in the result data, passing the first label to a variable, determining a vulnerability issue, and causing a message associated with the result data to be presented. Blocks 604, 608, and 612 are similar to blocks 502, 504, and 506 of FIG. 5 and, for brevity, their respective descriptions are not repeated.

At block 602, a static analyzer is executed to cause a static analysis to be performed on a set of program code. During the analysis session, the string manipulation operation is identified and, at block 606, a location of untrusted data in the result data of the string manipulation operation is identified. The label associated with the result data at block 608 can be based on the location identified at block 606. For example, a label to flag the result data can be identified based on one of the string of untrusted data being located on a left side of the result data, the string of untrusted data being located on a right side of the result data, and having a pattern replacement performed on the string of untrusted data. For another example, the string manipulation operation can be identified as a concatenation operation and, based on the structure of the concatenation operation and a location of the string in the structure, a prefix label can be selected when the string is located at a first end of the result data or a suffix label can be selected when the first string is located at a second end of the result data.

At block 610, the first label associated with the result data is passed to a variable during an assignment operation. For example, a first label can be attached to a second string based on an assignment of the first string to a second string. For another example, the labels associated with input arguments to an operation pass to the result data of the operation and any assignments of the result data to a variable also retain the labels of the result data. Resulting assignments can be analyzed based on a plurality of labels (including the neutral taint label associated with the string property) that are passed at each assignment operation and/or subsequent assignment to retain the string property label at each resulting variable of the assignments.

At block 612, the priority level of the result data can be identified when the result data arrives at a payload sensitive sink (e.g., a sink programmed to evaluate generic and neutral taint labels such as string property labels). The priority level of the result data (and/or variable to which the result data is assigned) can be evaluated and set based on the labels associated with the data based on the sensitivity of the sink to payload. For example, a first combination of labels may result in a first priority level and a second combination of labels can result in a second priority level. For another example, a priority level can be associated with a particular generic taint label or security taint label, but based on the neutral taint label being a prefix label (e.g., a label indicating a prefix concatenation of the string to produce the result data), the priority level of the result data can be decreased.

At block 614, vulnerability issue can be determined based on the label. The vulnerability issue can be based on the string property associated with the label. At block 616, a message associated with the result data can be caused to be presented based on the priority level. For example, the vulnerability issue identified at block 614 can be reported via a message from the static analyzer, and the vulnerability issue can be caused to be presented based on the priority level, such as in a particular font size or color. A report state (e.g., a state indicating whether the result data should be reported or unreported) can be evaluated at the payload sensitive sink. For example, the sink can determine the vulnerability issue is to be unreported when the priority level achieves a minimum threshold. The determination of whether to report and how to report issues of data when arriving at the sink can be based on a range of thresholds associated with the priority level of an issue. In this manner, a determination of a possible vulnerability (and associated priority level) of the program code can be based on the sensitivity of the sink and a plurality of labels associated with the data at the sink where the plurality of labels associated with the data being evaluated can include string property labels as well as security labels, generic labels, and/or neutral labels.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A static analysis system comprising:
a processor;
a memory to store instructions that, when executed by the processor, cause the processor to:
identify a string modification operation on a string during an analysis session based on a structural comparison of program code to a static analysis rule, the string modification operation to operate on untrusted data to produce result data;
maintain a first label with the string based on the static analysis rule, wherein the first label describes how the result data was built using operation of the string modification operation on the untrusted data, and a location of the string modification operation, and the first label to denote a string property;
pass a plurality of labels to a variable when an assignment operation is made of the string to the variable, the plurality of labels to include the first label;
set a priority level to the result data based on the first label; and
evaluate the priority level and a report state of the result data at a payload sensitive sink, wherein evaluating the priority level and the report state comprises identifying that the label denotes the string property and providing an analysis message associated with a vulnerability of the result data based on the first label.

2. The system of claim 1, wherein the string modification operation comprises one of a string concatenation or a string replacement operation.

3. The system of claim 1, wherein the structural comparison identifies the location of the string in the result data.

4. The system of claim 1, wherein the instructions, when executed by the processor, further cause the processor to:
translate the program code into an intermediate model to identify the modification operation in the program code and a field associated with the string, the intermediate model to utilize a mapping of known operations and fields to recognize a structure of the program code.

5. The system of claim 1, wherein:
the static analysis rule comprises a security rule; and
the instructions, when executed by the processor, cause the processor to identify a priority level of the vulnerability of the result data.

6. A non-transitory computer readable storage medium comprising a set of instructions executable by a processor resource to:
perform a comparison of a structure of program code to a condition of a static analysis rule via an intermediate model, the structure of program code to include a string representing a variable capable of receiving untrusted data from a user;
identify a concatenation operation on the string based on the comparison;

identify a location of the string in a result data of the concatenation operation based on a structure of the program code;

flag the result data of the concatenation operation with, based on the location of the string in the result data, one of:

a first label to denote an untrusted prefix when the location of the string is on a left-hand side of the result data; or a second label to denote an untrusted suffix when the location of the string is on a right-hand side of the result data;

pass a plurality of labels to a variable when an assignment operation is made of the string to the variable, wherein the plurality of labels includes the first label;

set a priority level to the result data based on the first label; and evaluate the priority level and a report state of the result data at a payload sensitive sink, wherein the report state indicates whether the result data is reported or unreported and the evaluating comprises reporting a security vulnerability issue associated with the result data when the result data is flagged with the first label, the security vulnerability issue being associated with a string property.

7. The medium of claim 6, wherein the set of instructions is executable by the processor resource to:

parse the program code to identify the structure of the program code; and translate the structure of the program code to the intermediate model.

8. The medium of claim 6, wherein the set of instructions is executable by the processor resource to:

determine the result data is not a vulnerability based on the second label.

9. The medium of claim 6, wherein the set of instructions is executable by the processor resource to:

cause a vulnerability report to include the result data when the result data is flagged with the first label; and cause the vulnerability report to lack the result data when the result data is flagged with the second label.

10. A method for static analysis of program code comprising:

identifying a string manipulation operation within the program code that operates on a first string based on a structural comparison of the program code;

flagging result data of the string manipulation operation with a first label based on a classification of the string manipulation operation, the classification to describe how the result data is built based on the first string;

setting a priority level to the result data based on the first label;

causing a message associated with the result data to be presented based on the priority level, wherein the message reports a security vulnerability of the result data; and passing a plurality of labels to a variable when an assignment operation is made of the first string to the variable, the plurality of labels to include the first label; and evaluating the priority level and a report state of the result data at a payload sensitive sink, the report state to indicate whether the result data is reported or unreported.

11. The method of claim 10, comprising:

attaching the first label to a second string based on an assignment of the first string to the second string;

identifying the first label to flag the result data based on one of the first string being located on a left side of the result data, the first string being located on a right side of the result data, and having a pattern replacement performed on the first string, analyzing the second string based on the first label; and identifying the priority level of the result data based on the first label when the result data arrives at a sink.

12. The method of claim 11, comprising:

identifying the string manipulation operation as a concatenation operation; and, based on a structure of the concatenation operation and a location of the first string, one of:

selecting a prefix label when the first string is located at a first end of the result data; and selecting a suffix label when the first string is located at a second end of the result data.

13. The method of claim 12, comprising:

decreasing the priority level of the result data at a sink when the first label represents the prefix label, the prefix label to indicate a prefix concatenation of the first string to produce the result data; and determining a vulnerability issue to be unreported when the priority level achieves a minimum threshold.

* * * * *